United States Patent
Eggers et al.

(10) Patent No.: US 9,651,080 B2
(45) Date of Patent: May 16, 2017

(54) METHOD FOR ATTACHING PLASTIC PRODUCT WITH INSERT

(71) Applicants: Steven Dean Eggers, Clinton, IA (US); Ronald A. Zimmer, Dewitt, IA (US)

(72) Inventors: Steven Dean Eggers, Clinton, IA (US); Ronald A. Zimmer, Dewitt, IA (US)

(73) Assignee: Custom-Pak, Inc., Clinton, IA (US)

( * ) Notice: Subject to any disclaimer, the term of this patent is extended or adjusted under 35 U.S.C. 154(b) by 0 days.

(21) Appl. No.: 14/705,269

(22) Filed: May 6, 2015

(65) Prior Publication Data

US 2015/0233411 A1 Aug. 20, 2015

Related U.S. Application Data

(62) Division of application No. 12/692,959, filed on Jan. 25, 2010, now Pat. No. 9,028,185.

(60) Provisional application No. 61/182,950, filed on Jun. 1, 2009.

(51) Int. Cl.
*F16B 37/12* (2006.01)
*F16B 39/04* (2006.01)
*F16B 39/10* (2006.01)
*F16B 39/02* (2006.01)

(52) U.S. Cl.
CPC ............ *F16B 37/125* (2013.01); *F16B 39/04* (2013.01); *F16B 37/122* (2013.01); *F16B 39/02* (2013.01); *F16B 39/10* (2013.01); *Y10T 29/49881* (2015.01); *Y10T 29/49904* (2015.01);
(Continued)

(58) Field of Classification Search
CPC ...... F16B 37/122; F16B 37/127; F16B 37/12; F16B 37/145; F16B 37/005; F16B 27/125; F16B 27/143; F16B 39/10; F16B 39/04; F16B 39/02; F16B 39/08; F16B 39/16; F16B 39/14; F16B 39/20; F16B 39/282; F16B 39/12; F16B 39/34; F16B 39/32; F16B 39/006; F16B 33/005; F16B 39/104; Y10T 29/49881; Y10T 29/49895; Y10T 29/49899; Y10T 29/49904;
(Continued)

(56) References Cited

U.S. PATENT DOCUMENTS

| 280,125 A | 6/1883 | Brauchler |
| 2,343,143 A * | 2/1944 | Gill ..................... F16B 13/061 29/509 |
| 2,444,145 A | 6/1948 | Rosan |

(Continued)

*Primary Examiner* — Jermie Cozart
(74) *Attorney, Agent, or Firm* — St. Onge Steward Johnston & Reens, LLC

(57) ABSTRACT

A method for joining a plastic part to a second part with an insert adapted to thread into the plastic part. The insert includes a longitudinal body with outer threads, a hole in the longitudinal body with female threads, and an annular flange. Protrusions and recesses on the bottom of the annular flange alternate in a radial pattern. The insert is threaded into an opening in the plastic part. The protrusions and recesses of the insert interact with the plastic part to resist over rotation of the insert. The opening in the plastic part may include a hole and a counter bore portion. The counter bore includes protrusions and recesses. The protrusions and recesses alternate in a radial pattern. When the insert is threaded into the opening, the protrusions and recesses of the insert interact with the protrusions and recesses of the plastic part and resist over rotation.

20 Claims, 4 Drawing Sheets

(52) U.S. Cl.
CPC .... *Y10T 29/49936* (2015.01); *Y10T 29/49947* (2015.01); *Y10T 29/49963* (2015.01)

(58) Field of Classification Search
CPC ......... Y10T 29/49947; Y10T 29/49963; Y10T 29/49966; Y10T 29/49936
USPC ....................................................... 411/294
See application file for complete search history.

(56) References Cited

U.S. PATENT DOCUMENTS

| | | | |
|---|---|---|---|
| 3,279,519 A | 10/1966 | Neuschotz | |
| 3,280,874 A | 10/1966 | Rosan | |
| 3,803,667 A | 4/1974 | Rose | |
| 4,125,051 A * | 11/1978 | Herkes | F16B 23/0076 411/402 |
| 4,223,585 A | 9/1980 | Barth et al. | |
| 4,712,955 A | 12/1987 | Reece et al. | |
| 4,836,729 A | 6/1989 | Bisping et al. | |
| 4,844,139 A | 7/1989 | John | |
| 5,039,262 A | 8/1991 | Giannuzzi | |
| 5,190,425 A | 3/1993 | Wieder et al. | |
| 5,238,342 A | 8/1993 | Stencel | |
| 5,347,078 A * | 9/1994 | Eckels | A61M 5/3213 206/365 |
| 6,439,817 B1 | 8/2002 | Reed | |
| 6,530,731 B2 | 3/2003 | Wheeler | |
| 6,592,311 B2 * | 7/2003 | Wojciechowski | B23P 19/062 411/107 |
| 6,637,994 B2 * | 10/2003 | Leistner | F16B 37/065 411/177 |
| 6,784,597 B1 | 8/2004 | Hess et al. | |
| 7,124,492 B2 | 10/2006 | Wojciechowski et al. | |
| 7,278,341 B1 | 10/2007 | Novin et al. | |
| 7,318,696 B2 * | 1/2008 | Babej | B23P 19/062 29/432.2 |
| 7,322,273 B2 | 1/2008 | Rafn | |
| 7,465,136 B2 | 12/2008 | Nagayama | |
| 7,674,081 B2 * | 3/2010 | Selle | F16B 27/00 411/179 |
| 7,731,464 B2 | 6/2010 | Nagayama | |
| 7,815,406 B2 * | 10/2010 | Babej | B23P 19/062 411/181 |
| 8,226,339 B2 * | 7/2012 | Neri | F16B 37/067 411/161 |
| 8,261,422 B2 * | 9/2012 | Babej | B23P 19/062 29/432.1 |
| 8,596,668 B2 * | 12/2013 | Van Bregmann, Jr. | A63C 10/14 280/14.24 |
| 9,028,185 B2 * | 5/2015 | Eggers | F16B 37/122 411/178 |
| 9,175,715 B2 * | 11/2015 | Babej | F16B 37/068 |
| 9,297,405 B2 * | 3/2016 | Diehl | B23P 19/00 |
| 2003/0099525 A1 | 5/2003 | Michels | |
| 2005/0053449 A1 | 3/2005 | Grubert et al. | |
| 2005/0095078 A1 * | 5/2005 | Makino | F16B 37/067 411/183 |
| 2005/0123379 A1 | 6/2005 | Barina et al. | |
| 2006/0078402 A1 | 4/2006 | Barnsdale | |
| 2006/0137166 A1 * | 6/2006 | Babej | B23P 19/062 29/509 |
| 2008/0193256 A1 | 8/2008 | Neri | |
| 2008/0240883 A1 | 10/2008 | Walling | |
| 2009/0080998 A1 * | 3/2009 | Nagayama | F16B 3/06 411/432 |
| 2010/0303581 A1 * | 12/2010 | Eggers | F16B 37/122 411/304 |
| 2012/0025490 A1 * | 2/2012 | Van Bregmann, Jr. | A63C 10/14 280/607 |
| 2012/0308329 A1 * | 12/2012 | Babej | B23P 19/062 411/166 |
| 2015/0233411 A1 * | 8/2015 | Eggers | F16B 37/125 29/456 |

\* cited by examiner

METHOD FOR ATTACHING PLASTIC PRODUCT WITH INSERT

FIELD OF THE INVENTION

The present invention is directed to a plastic part incorporating one or more inserts allowing for the plastic part to be joined to some other part by conventional metal screws, bolts or other similar threaded members.

BACKGROUND OF THE INVENTION

It is often desirable for plastic parts, such as blow molded plastic parts, to be attached to another part by conventional screws, bolts or some other similar threaded member (collectively referred to herein as "threaded fasteners"). The plastic part may be attached to a part made of metal, wood, or another material.

Because of the properties of the plastic part, and the diameter and thread size of conventional threaded fasteners, satisfactory threaded engagement directly with the plastic part may not be achievable. The threaded fastener may strip an opening formed directly in the plastic part. Metal inserts are commonly used to remedy this problem. The insert is inserted into an opening created in the plastic part, and the conventional threaded fastener threads into a threaded female opening in the insert.

While the conventional inserts may provide benefits over using no inserts at all, they still suffer from several disadvantages. One of such disadvantages is that, during insertion of the insert into the hole in the plastic part, it is relatively easy to over-rotate the insert with respect to the plastic part, thereby stripping the female threads in the opening in the plastic part. Consequently, the attachment of a second part to the plastic part may not be satisfactory.

SUMMARY OF THE INVENTION

An object of the present invention is to remedy the problem of over-rotation of the insert within the plastic part. The present invention modifies the insert to make it significantly more difficult to over-rotate the insert within the plastic part. The present invention may also modify the plastic part in a similar manner to further resist over-rotation of the insert. These modifications remedy the over-rotation problem commonly present with the conventional insert. The invention allows a blow molded plastic part to join to a second part. The second part can be made of wood, metal or another material.

The present invention uses an insert to join a first part to a second part. The insert has a longitudinal body, the outer surface of the longitudinal body having male threads. An annular flange is provided on one end of the longitudinal body, and there is a threaded hole in the center of the longitudinal body. The annular flange has an inner circumference defined by where the longitudinal body and the annular flange meet. The annular flange also has an outer circumference. Protrusions and recesses alternate in a radial pattern around the annular flange. The protrusions and recesses extend axially inward between the outer and inner circumferences of the annular flange. The insert is threaded into an opening in the first part, which is a blow molded plastic part. The protrusions and recesses are on the side of the flange that faces the first part upon installation.

The second part is secured to the first part with a threaded fastener. The threaded fastener is secured to the threaded hole in the insert, thereby attaching the first part to the second part.

The annular flange on the insert has a larger diameter than the conventional insert. The larger diameter allows for greater resistance to over-rotation of the insert within the plastic part. The threads on the outside of the longitudinal body of the insert may be discontinuous and/or coarse.

The present invention may also include modifications to the opening in the blow molded plastic part. The blow molded plastic part of the present invention has a hole and a counter bore hole. The hole in the plastic part may be threaded to receive the insert, or the hole may be unthreaded. The blow molded plastic part of the present invention further includes protrusions and recesses on the counter bore hole. The protrusions and recesses alternate around the counter bore hole. The protrusions and recesses are in the opposite pattern of the protrusions and recesses on the annular flange of the insert. When the insert is threaded into the opening in the blow molded plastic part, the recesses and protrusions on the annular flange interlock with the recesses and protrusions in the counter bore hole, resisting over-rotation of the insert relative to the plastic part. The diameter of the counter bore hole is large enough to fit the annular flange of the insert. Use of a larger diameter counter bore hole and a larger annular flange on the insert results in greater resistance to over-rotation in comparison to the conventional insert.

The plastic part with the modified opening attaches to a second part with a threaded fastener. The threaded fastener threads into the hole in the insert, thereby securing the second part to the plastic part.

The present invention also includes a method for attaching a first blow molded part to a second part. The method includes providing an insert, where the insert has a longitudinal body with a centered threaded hole and male threads on the outside. An annular flange is on one end of the longitudinal body, the annular flange has protrusions and recesses alternating around in a radial pattern.

The method further includes providing a blow molded plastic part with an opening. The opening has a threaded hole and a counter bore hole. The counter bore hole includes protrusions and recesses alternating in a radial pattern around the counter bore hole.

The method further includes inserting the insert into the threaded opening, and turning the insert until the protrusions and recesses on the annular flange interlock with the protrusions and recesses on the counter bore hole. Then attaching a second part to the blow molded part with a threaded fastener, where the threaded fastener is threaded into the threaded hole in the insert.

A second embodiment of the method for securing a first blow molded part to a second part is, manufacturing the insert with protrusions and recesses as discussed above, manufacturing a plastic part with a female threaded opening, inserting the insert into the opening, turning the insert until the protrusions and recesses on the annular flange interact with the plastic part. Then attaching a second part to the blow molded part with a threaded fastener, where the threaded fastener is threaded into the threaded hole in the insert.

As the inventive metal insert is rotated into the opening in the inventive plastic part and approaches full insertion, the radial spoke-like protrusions on the underside of the inventive metal insert interact with the radial spoke-like protrusions in the recess surrounding the opening of the inventive plastic part, thereby inhibiting the inventive metal insert from being over-rotated and thereby inhibiting stripping out of the opening in the inventive plastic part. The larger diameter of the annular flange of the inventive metal insert allows for the spoke-like protrusions of the annular flange and of the recess surrounding the opening of the inventive plastic part to be larger (i.e., to extend out to a further degree), thereby further enhancing their interaction and further inhibiting over-rotation.

The invention and its particular features and advantages will become more apparent from the following detailed description considered with reference to the accompanying drawings.

DETAILED DESCRIPTION OF THE INVENTION

The present invention modifies a conventional insert to remedy a common problem of over-rotation within blow molded plastic parts. The inserts make it possible to attach a blow molded plastic part to another part using conventional threaded fasteners. But, when the insert is over-rotated, the threads in the blow molded plastic part are stripped, causing an unsatisfactory connection between the insert and the blow molded part. This unsatisfactory connection between the insert and the blow molded part further causes an unsatisfactory connection between the blow molded part and a second part to be joined by conventional fasteners.

Figure 1:
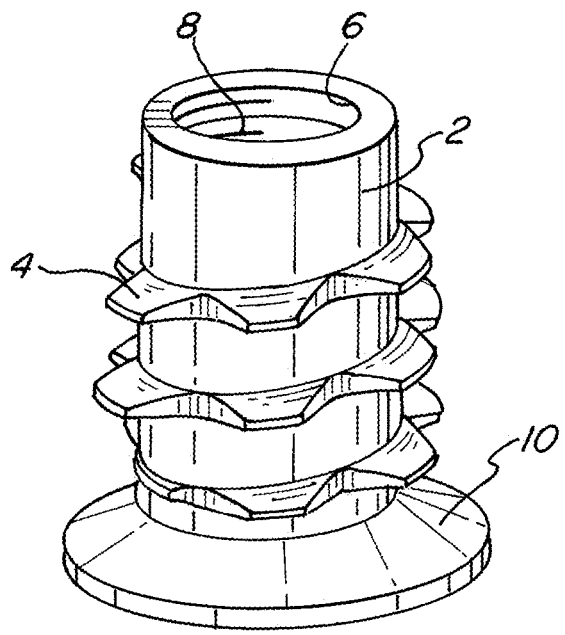
FIGS. 1 and 2 are isometric views of a conventional metal insert as is known in the prior art.
Figure 2:
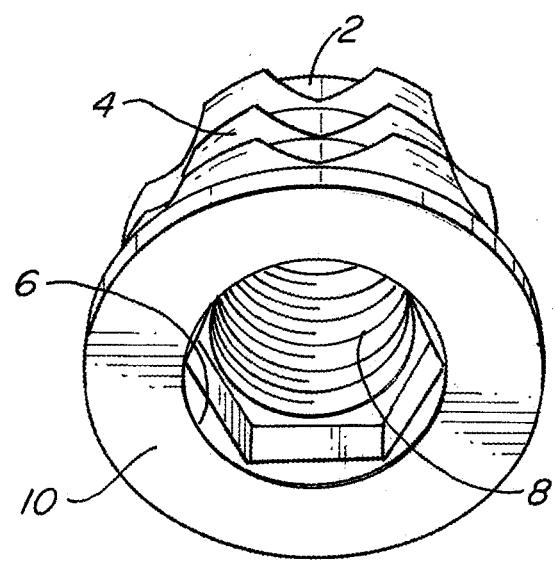

FIGS. 1 and 2 show a prior art insert. As can be seen, the insert includes a longitudinal body 2 having relatively coarse threads 4 (which may be discontinuous threads as shown in the Figures) on the outer periphery thereof. The body has an opening 6 passing therethrough, with finer, female threads 8 therein which are sized and shaped to receive a conventional threaded fastener. At one end of the insert, an annular flange 10 protrudes outwardly in order to limit the degree to which the insert may be inserted into an opening in a plastic part.

Figure 3:
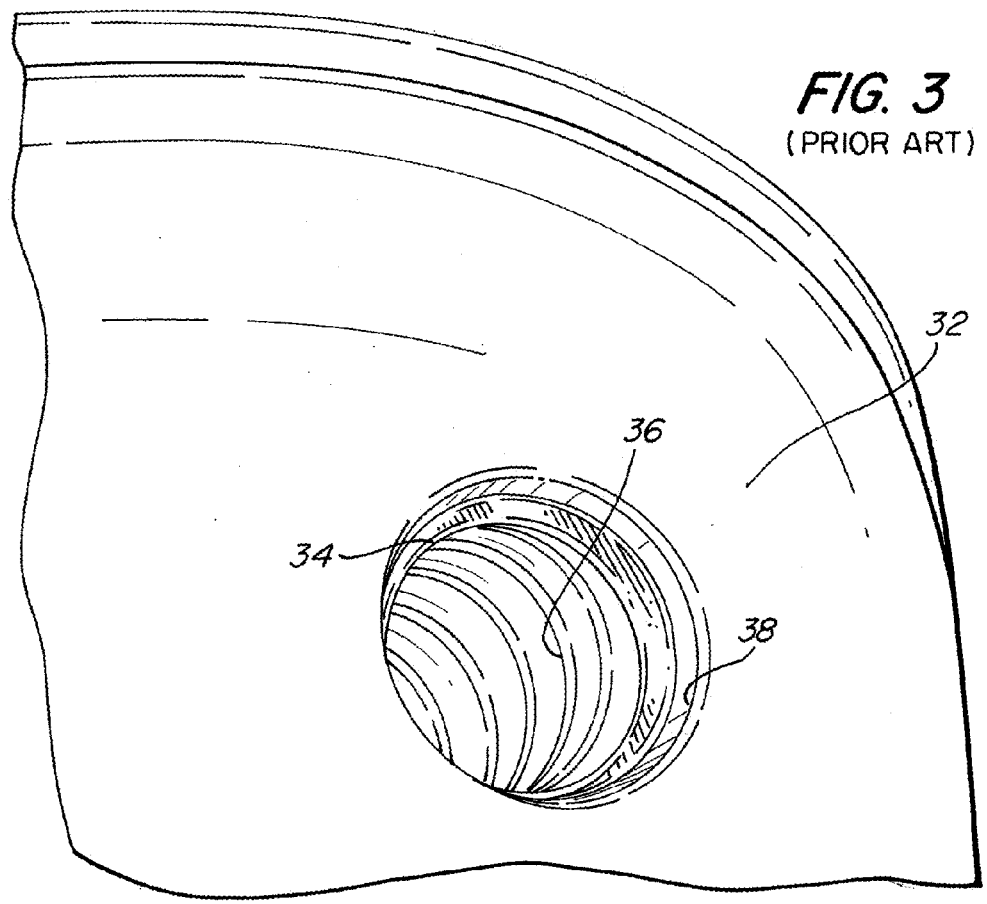
FIG. 3 is an isometric view of a blow molded plastic part as known in the prior art

FIG. 3 shows a plastic part as known in the prior art 32 (in this case, a blow molded seat bottom) having an opening 34 made therein with relatively coarse female threads 36. The opening and the threads are sized and shaped to receive the conventional metal insert. A generally smooth recessed area 38 surrounds the opening which is sized and shaped to receive the annular flange of the conventional metal insert.

Figure 4:
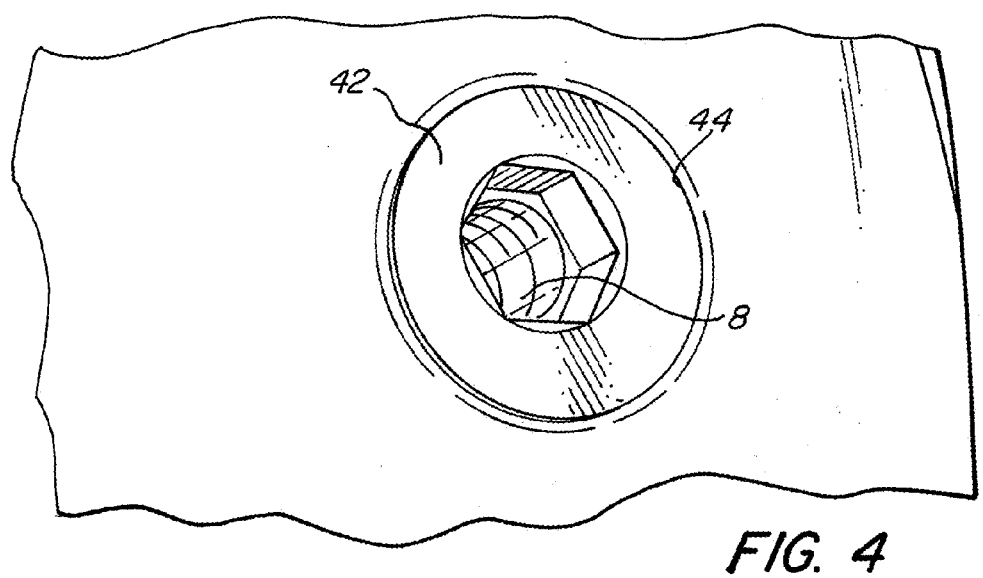
FIG. 4 shows the prior art insert installed in the prior art plastic part

FIG. 4 shows the prior art insert fully installed in a plastic part. The top surface of the annular flange 42 is generally flush with a surface of the plastic part 44, or may be slightly recessed. A second part may now be securely attached to the plastic part using a conventional threaded fastener. The conventional threaded fastener is threaded into the inner female threads 8.

Figure 5:
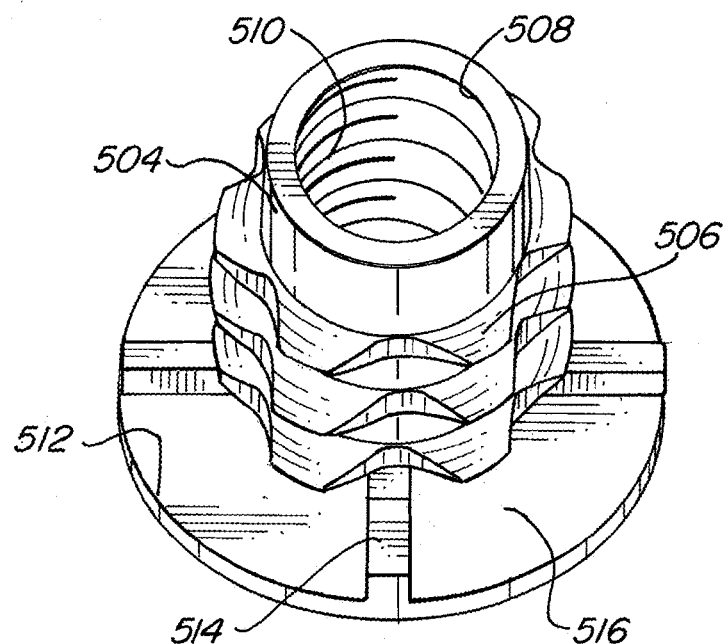
FIGS. 5 and 6 are isometric views of the inventive metal insert.

FIG. 5 shows the inventive metal insert. As can be seen, the insert includes a longitudinal body 504 having relatively coarse threads 506 (which may be discontinuous threads as shown in the Figures) on the outer periphery thereof. The body has an opening 508 passing therethrough, with finer, female threads 510 therein which are sized and shaped to receive a conventional threaded fastener. At one end of the insert, an annular flange 512 protrudes outwardly in order to limit the degree to which the insert may be inserted into an opening in a plastic part. There are protrusions 514 and recesses 516 on the annular flange. These protrusions and recesses interact with a plastic part when the insert is installed into the plastic part. The interaction of the protrusions and recesses with the plastic part resists over rotation of the insert within an opening in a plastic part.

Figure 6:
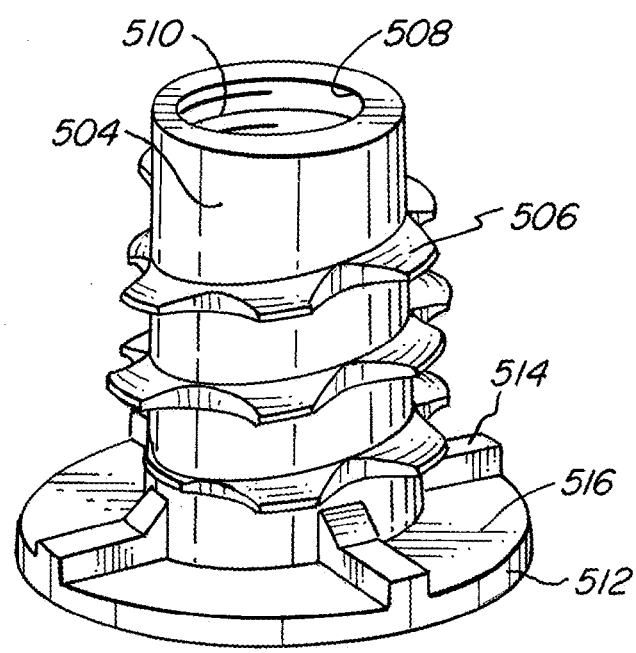

FIG. 6 is a side view of the inventive metal insert of FIG. 5. As can be seen, the insert includes a longitudinal body 504 having relatively coarse threads 506 (which may be discontinuous threads as shown in the Figures) on the outer periphery thereof. The body has an opening 508 passing therethrough, with finer, female threads 510 therein which are sized and shaped to receive a conventional threaded fastener. At one end of the insert, an annular flange 512 protrudes outwardly in order to limit the degree to which the insert may be inserted into an opening in a plastic part, the annular flange 512 having a diameter larger than, and preferably at least 30% larger than, a diameter of the threads 506. There are protrusions 514 and recesses 516 on the annular flange. These protrusions and recesses interact with a plastic part when the insert is installed into the plastic part. The interaction of the protrusions and recesses with the plastic part resists over rotation of the insert within an opening in a plastic part.

Figure 7:
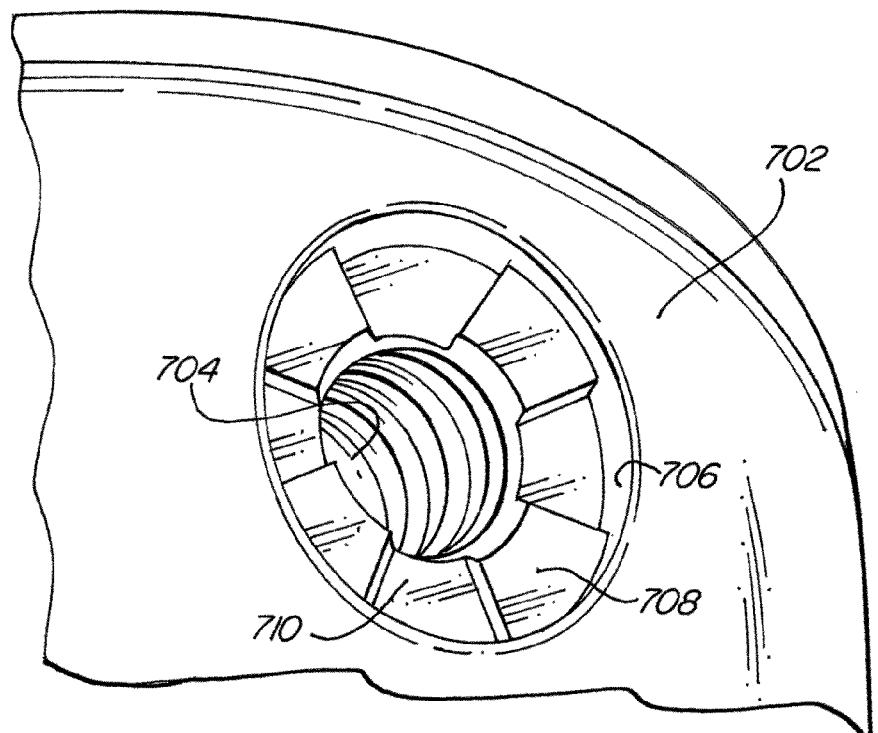
FIG. 7 is an isometric view of the inventive plastic part in which the inventive metal insert of FIGS. 5 and 6 is installed.

FIG. 7 is an isometric view of the plastic part with the inventive opening that is modified to receive the inventive insert of FIGS. 5 and 6. The plastic part 702 has an opening 704. Within the opening female threads may be added (not shown). There is a counter bore hole 706 that surrounds the opening 704, the counter bore hole 706 having a diameter larger than, and preferably at least 30% larger than, a diameter of the opening 704. The bottom surface of the counter bore hole has protrusions 708 and recesses 710. The protrusions and recesses alternate radially around the bottom surface of the counter bore hole. The protrusions and recesses in the counter bore hole of the plastic part interact with the protrusions and recesses on the inventive insert disclosed in FIGS. 5 and 6. The interaction of the protrusions and recesses on each part resist overrotaion of the inventive metal insert when the insert is installed into the plastic part.

Figure 8:
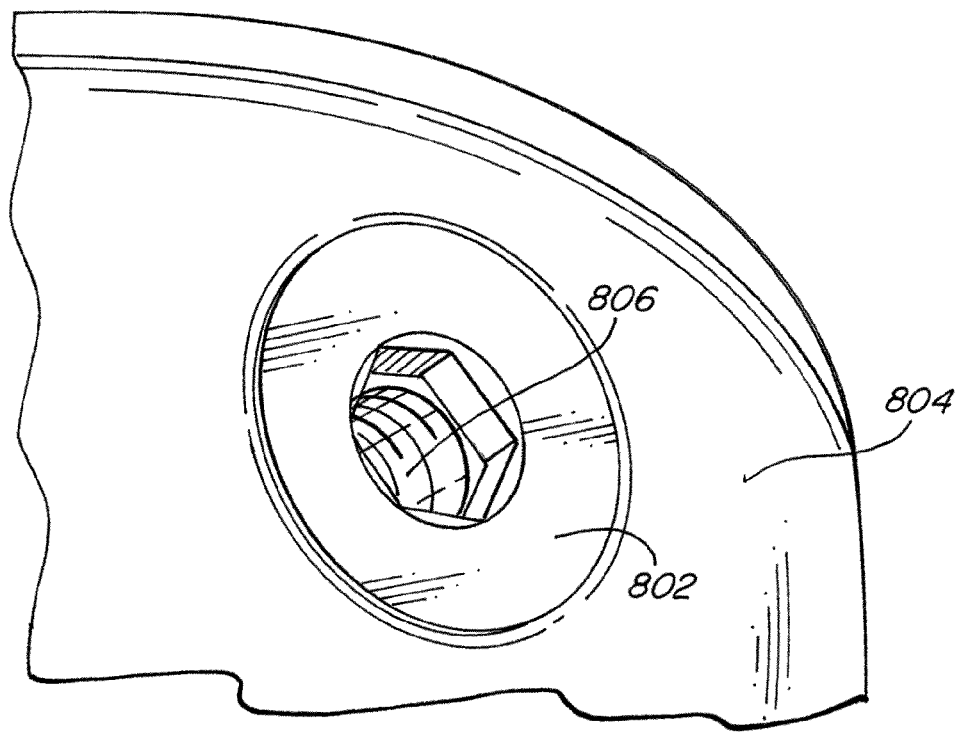
FIG. 8 shows the inventive metal insert of FIGS. 5 and 6 installed in the inventive plastic part of FIG. 7.

FIG. 8 is an isometric view of the plastic part with an installed metal insert. The top surface of the annular flange 802 is generally flush with a surface of the plastic part 804, or may be slightly recessed. A second part may now be securely attached to the plastic part using a conventional threaded fastener. The conventional threaded fastener is threaded into the inner female threads 806.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for attaching an insert and a first part, comprising the steps of:

providing an insert, the insert comprising a longitudinal body with external threads and a threaded hole, the insert comprising an annular flange on one end of the longitudinal body, the annular flange comprising protrusions and recesses, wherein the protrusions and recesses alternate in a radial pattern around the flange;

providing a first part, the first part comprising an opening, wherein the opening includes a threaded portion and a counter bore portion, the counter bore portion including protrusions and recesses, wherein the protrusions and recesses alternate in a radial pattern around the counter bore hole;

inserting the insert into the opening in the first part; and turning the insert within the first part until the protrusions and recesses on the annular flange interlock with the protrusions and recesses in the counter bore hole;

wherein the protrusions and recesses of the first part are present in the counter bore hole prior to said inserting and turning steps.

2. The method of claim 1, further comprising the step of attaching a second part to the first part with a threaded fastener, wherein the threaded fastener is threaded into the threaded hole in the longitudinal body of the insert.

3. The method of claim 1, wherein the first part is made of plastic.

4. The method of claim 1, further comprising the step of blow molding the first part from plastic.

5. The method of claim 1, wherein the annular flange of the insert has a first diameter and the outer threads of the insert have a second diameter, the first diameter being at least 30% larger than the second diameter.

6. The method of claim 5, wherein the counter bore portion of the opening of the first part has a third diameter and the threaded portion of the opening of the first part has a fourth diameter, the third diameter being at least 30% larger than said fourth diameter.

7. The method of claim 1, wherein the insert is made of metal.

8. The method of claim 1, wherein the external threads of the insert are discontinuous and coarse.

9. A method for attaching a blow molded plastic part to another part comprising:

providing an insert, the insert comprising a longitudinal body with external threads and a threaded hole, the insert comprising an annular flange on one end of the longitudinal body, the annular flange comprising protrusions and recesses, wherein the protrusions and recesses alternate in a radial pattern around the flange providing a plastic part, the plastic part comprising an opening having protrusions and recesses therein, inserting the insert into the opening in the plastic part, turning the insert within the plastic part until the protrusions and recesses on the annular flange interact with the protrusions and recesses of the opening in the plastic part, attaching a second part to the plastic part with a threaded fastener, wherein the threaded fastener is threaded into the threaded hole in the longitudinal body of the insert.

10. The method of claim 9, wherein the first part is made of plastic.

11. The method of claim 9, further comprising the step of blow molding the first part from plastic.

12. The method of claim 9, wherein the annular flange of the insert has a first diameter and the outer threads of the insert have a second diameter, the first diameter being at least 30% larger than the second diameter.

13. The method of claim 12, wherein the counter bore portion of the opening of the first part has a third diameter and the threaded portion of the opening of the first part has a fourth diameter, the third diameter being at least 30% larger than said fourth diameter.

14. The method of claim 9, wherein the insert is made of metal.

15. The method of claim 9, wherein the external threads of the insert are discontinuous and coarse.

16. A method for attaching a blow molded plastic part to a second part using an insert, comprising the following steps, in sequence:

blow molding a plastic part, the plastic part comprising an opening, wherein the opening includes a threaded portion and a counter bore portion, the counter bore portion including protrusions and recesses which alternate in a radial pattern around the counter bore hole;

then providing an insert and a second part, the insert comprising a longitudinal body with a threaded internal surface and a threaded external surface, the insert further comprising an annular flange on one end of the longitudinal body, the annular flange comprising protrusions and recesses alternating in a radial pattern about the flange and the second part comprising a threaded fastener;

then inserting the insert into the opening of the plastic part;

then turning the insert within the first part until the protrusions and recesses on the annular flange interlock with the protrusions and recesses in the counter bore hole;

then threading the second part into the internal threaded surface of the insert.

17. The method of claim 16, wherein the annular flange of the insert has a first diameter and the outer threads of the insert have a second diameter, the first diameter being at least 30% larger than the second diameter.

18. The method of claim 17, wherein the counter bore portion of the opening of the first part has a third diameter and the threaded portion of the opening of the first part has a fourth diameter, the third diameter being at least 30% larger than said fourth diameter.

19. The method of claim 16, wherein the insert is made of metal.

20. The method of claim 16, wherein the external threads of the insert are discontinuous and coarse.

* * * * *